United States Patent
Liu et al.

(10) Patent No.: US 7,499,690 B1
(45) Date of Patent: Mar. 3, 2009

(54) VARIABLE FREQUENCY CLOCK GENERATOR FOR SYNCHRONIZING DATA RATES BETWEEN CLOCK DOMAINS IN RADIO FREQUENCY WIRELESS COMMUNICATION SYSTEMS

(75) Inventors: Tao Liu, Sunnyvale, CA (US); Mansour Keramat, San Jose, CA (US); Edward Wai Yeung Liu, Milpitas, CA (US); Mehrdad Heshami, Palo Alto, CA (US); Timothy C. Kuo, Cupertino, CA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 11/954,857

(22) Filed: Dec. 12, 2007

Related U.S. Application Data

(62) Division of application No. 11/132,978, filed on May 18, 2005, now Pat. No. 7,389,095.

(60) Provisional application No. 60/647,077, filed on Jan. 24, 2005.

(51) Int. Cl.
*H04B 1/06* (2006.01)

(52) U.S. Cl. .................. 455/260; 455/324; 375/327; 331/19

(58) Field of Classification Search ......... 455/255–260, 455/295, 296, 323, 324, 333; 375/316, 324, 375/327, 345, 346; 331/16, 18, 19
See application file for complete search history.

(56) References Cited

U.S. PATENT DOCUMENTS

| | | | |
|---|---|---|---|
| 4,983,970 A | 1/1991 | O'Donnell et al. | |
| 5,020,137 A | 5/1991 | Barsumian | |
| 5,802,463 A | 9/1998 | Zuckerman | |
| 5,963,160 A | 10/1999 | Wilson et al. | |
| 6,148,052 A | 11/2000 | Bogdan | |
| 6,169,767 B1 | 1/2001 | Strolle et al. | |
| 6,233,200 B1 | 5/2001 | Knoll et al. | |
| 6,501,307 B1 | 12/2002 | Yen | |

(Continued)

OTHER PUBLICATIONS

Liu, Tao, et al., "Variable Frequency Clock Generator For Synchronizing Data Rates Between Clock Domains in Radio Frequency Wireless Communication Systems," U.S. Appl. No. 11/954,935, filed Dec. 12, 2007.

(Continued)

*Primary Examiner*—Nhan T Le
(74) *Attorney, Agent, or Firm*—Cooley Godward Kronish LLP

(57) ABSTRACT

A system, method and system are disclosed for using a variable frequency clock generator to synchronize an average data rate over intervals of time in a variable clock domain to make it equal to a fixed data rate in a fixed clock domain while reducing electromagnetic interference, among other things. In various embodiments, setting the data rates equal to each other minimizes storage used to transition data signals between clock domains. In one embodiment, a variable frequency clock generator includes a phase modulator configured to form a variable frequency clock. Also, the variable clock generator is configured to maintain an average frequency over specific periods of time for the range of discrete frequencies. The phase-offset controller sets an average clock having substantially no offset between a fixed data rate in the fixed clock domain and an average data rate in the variable clock domain.

4 Claims, 7 Drawing Sheets

U.S. PATENT DOCUMENTS

| | | | |
|---|---|---|---|
| 6,643,317 B1 * | 11/2003 | Blumer | 375/130 |
| 6,664,827 B2 | 12/2003 | O'Leary et al. | |
| 6,687,319 B1 | 2/2004 | Perino et al. | |
| 6,701,133 B1 | 3/2004 | Bennett et al. | |
| 6,823,025 B2 * | 11/2004 | Lee et al. | 375/320 |
| 6,973,145 B1 | 12/2005 | Smith et al. | |
| 7,026,878 B2 | 4/2006 | Smith | |
| 7,085,949 B2 | 8/2006 | Mar et al. | |
| 7,230,981 B2 | 6/2007 | Hill | |
| 7,236,057 B2 * | 6/2007 | Kaizuka | 331/1 A |
| 7,299,020 B2 * | 11/2007 | Shen et al. | 455/188.1 |
| 7,333,527 B2 | 2/2008 | Greenstreet et al. | |
| 2005/0053120 A1 | 3/2005 | Kim et al. | |
| 2005/0181741 A1 * | 8/2005 | Raj et al. | 455/73 |
| 2005/0277396 A1 * | 12/2005 | Pipilos | 455/253.2 |

OTHER PUBLICATIONS

Liu, Tao, et al., "Variable Frequency Clock Generator For Synchronizing Data Rates Between Clock Domains in Radio Frequency Wireless Communication Systems," U.S. Appl. No. 11/955,101, filed Dec. 12, 2007.

Liu, Tao, et al., "Variable Frequency Clock Generator For Synchronizing Data Rates Between Clock Domains in Radio Frequency Wireless Communication Systems," U.S. Appl. No. 12/106,167, filed Apr. 18, 2008.

Liu, Tao, et al., "Radio Frequency Antenna System and High-Speed Digital Data Link to Reduce Electromagnetic Interference for Wireless Commuincations," U.S. Appl. No. 11/132,757, filed May 18, 2005.

* cited by examiner

| Input code | | effective division | PLL output frequency | freq/12 |
|---|---|---|---|---|
| two's cmp | binary | | | |
| -127 | 1 | 11.0078125 | 484.34375 | 40.36197917 |
| -126 | 2 | 11.015625 | 484.6875 | 40.390625 |
| -125 | 3 | 11.0234375 | 485.03125 | 40.41927083 |
| -124 | 4 | 11.03125 | 485.375 | 40.44791667 |
| -123 | 5 | 11.0390625 | 485.71875 | 40.4765625 |
| -122 | 6 | 11.046875 | 486.0625 | 40.50520833 |
| -121 | 7 | 11.0546875 | 486.40625 | 40.53385417 |
| ... | ... | ... | ... | ... |
| -65 | 63 | 11.4921875 | 505.65625 | 42.13802083 |
| -64 | 64 | 11.5 | 506 | 42.16666667 |
| -63 | 65 | 11.5078125 | 506.34375 | 42.1953125 |
| -62 | 66 | 11.515625 | 506.6875 | 42.22395833 |
| -61 | 67 | 11.5234375 | 507.03125 | 42.25260417 |
| -60 | 68 | 11.53125 | 507.375 | 42.28125 |
| ... | ... | ... | ... | ... |
| -3 | 125 | 11.9765625 | 526.96875 | 43.9140625 |
| -2 | 126 | 11.984375 | 527.3125 | 43.94270833 |
| -1 | 127 | 11.9921875 | 527.65625 | 43.97135417 |
| 0 | 128 | 12 | 528 | 44 |
| 1 | 129 | 12.0078125 | 528.34375 | 44.02864583 |
| 2 | 130 | 12.015625 | 528.6875 | 44.05729167 |
| 3 | 131 | 12.0234375 | 529.03125 | 44.0859375 |
| 4 | 132 | 12.03125 | 529.375 | 44.11458333 |
| ... | ... | ... | ... | ... |
| 60 | 188 | 12.46875 | 548.625 | 45.71875 |
| 61 | 189 | 12.4765625 | 548.96875 | 45.74739583 |
| 62 | 190 | 12.484375 | 549.3125 | 45.77604167 |
| 63 | 191 | 12.4921875 | 549.65625 | 45.8046875 |
| 64 | 192 | 12.5 | 550 | 45.83333333 |
| 65 | 193 | 12.5078125 | 550.34375 | 45.86197917 |
| 66 | 194 | 12.515625 | 550.6875 | 45.890625 |
| ... | ... | ... | ... | ... |
| 121 | 249 | 12.9453125 | 569.59375 | 47.46614583 |
| 122 | 250 | 12.953125 | 569.9375 | 47.49479167 |
| 123 | 251 | 12.9609375 | 570.28125 | 47.5234375 |
| 124 | 252 | 12.96875 | 570.625 | 47.55208333 |
| 125 | 253 | 12.9765625 | 570.96875 | 47.58072917 |
| 126 | 254 | 12.984375 | 571.3125 | 47.609375 |
| 127 | 255 | 12.9921875 | 571.65625 | 47.63802083 |

FIG. 7

VARIABLE FREQUENCY CLOCK GENERATOR FOR SYNCHRONIZING DATA RATES BETWEEN CLOCK DOMAINS IN RADIO FREQUENCY WIRELESS COMMUNICATION SYSTEMS

CROSS REFERENCE TO RELATED APPLICATIONS

This application is a divisional application of U.S. application Ser. No. 11/132,978 filed May 18, 2005, now U.S. Pat. No. 7,389,095, which application claims the benefit of U.S. Provisional Application No. 60/647,077 filed Jan. 24, 2005. These applications are incorporated herein by reference in their entirety.

BRIEF DESCRIPTION OF THE INVENTION

This invention relates generally to wireless communications, and more particularly, to a variable frequency clock generator for exchanging digitized communications data via a high-speed digital link while producing reduced electromagnetic interference ("EMI"), the high-speed digital link being composed of unshielded conductors, for example. In one embodiment, the variable frequency clock generator synchronizes an average data rate for a variable clock domain over an interval of time with a fixed data rate for a fixed clock domain. This at least minimizes an amount of temporary storage for transitioning digitized communications data between multiple clock domains.

BACKGROUND OF THE INVENTION

Traditional spread spectrum clock generators have recently been developed to replace fixed clock generators, such as crystal oscillators, for reducing electromagnetic interference ("EMI") in high-speed digital electronic systems. Spread spectrum clock generators suppress undesired tones by spreading signal energy of digitized data signals over bands of frequencies to reduce spectral power. Undesired harmonics usually give rise to unacceptable levels of EMI in high-speed digital applications, such as computer peripheral devices consumer electronics, and embedded controller systems.

FIG. 1 depicts a typical system 100 implementing a conventional spread spectrum clock generator 122 for reducing EMI. System 100 includes a general-purpose graphics processing unit ("GPU") 120 to generate digitized pixel data for rendering computer-generated graphical images. A liquid crystal display driver 102 then processes the pixel data to display the images via connection 103 on a liquid crystal display ("LCD") 101. Fixed clock generator 124 controls the timing of the internal processes of GPU 120 and spread spectrum clock generator 122 generates a spread clock 106 for transmitting the pixel data over connection 104 at varying clock frequencies or data rates to minimize EMI.

While functional, the above-described spread spectrum clock generator and its approach to minimize EMI have several drawbacks that limit their use primarily to LCDs. One drawback is that conventional spread spectrum clock generators facilitate only one-way data transfers over connection 104. In particular, these generators are not configured to coordinate two-way data transfers. Another drawback is that conventional spread spectrum clock generators generally do not control the variability of the average data rate at which data arrives at the receiving end (e.g., at LCD display 101) of the spread spectrum clock signal. Consequently, spread clock 106 typically transmits data via connection 104 at average data rates that can drift faster or slower than a center frequency about which frequencies are spread. Also, spread clock 106 is usually the clock source for retransmitting data via connection 103. Note that the variation in the average data rates of the retransmitted data therefore varies the rates at which pixels are written to the display. Fortunately, the variability in the retransmission data rate to LCD display 101 is tolerable as the human eye cannot visually detect the effects of the different rates at which pixels are written the display. But to ensure the drift in average data rates over periods of time remain imperceptible to prevent in blurring of images, the amount of frequencies in the range of frequencies is limited to 2% to 3%, for example, about the center frequency. A drawback to limiting the number of frequencies results in less energy being spread over the range of frequencies, thereby limiting the amount of EMI that can be reduced. Another drawback to the above-described spread spectrum clock generator is that it is implemented to facilitate only unidirectional data transfers (e.g., from LCD driver 102 to display 101). It is not suited for establishing reliable bidirectional data transfers that are critical for a number of RF communication systems.

In view of the foregoing, it would be desirable to provide a variable-frequency clock generator that minimizes the above-mentioned drawbacks when implementing variable data rates to spread signal energy of data signals in high-speed digital links used in RF communications systems.

SUMMARY OF THE INVENTION

A system, method and system are disclosed for using a variable clock generator to synchronize or make equal data rates between a fixed clock domain and a variable clock domain while reducing electromagnetic interference ("EMI"), among other things. In various embodiments, synchronizing data rates across clock domains minimizes storage used to transition data signals between clock domains, one of those data rates being an average data rate (or "rate-averaged data rate") over an interval of time. In one embodiment, a variable frequency clock generator includes a phase modulator configured to shift a fixed clock frequency signal to form a variable frequency clock signal for reducing EMI, whereby the variable frequency clock signal is used to establish a rate-averaged data rate for setting data rates equal or about equal over multiple clock domains. In various embodiments, the variable frequency clock synchronizes data rates across clock domains to minimize and/or negate average data rates of the variable clock domain from drifting from the fixed data rate of the fixed clock domain.

The variable clock generator also includes a phase-offset controller to maintain an average frequency for a range of discrete frequencies. Notably, the phase-offset controller sets an average data rate based on the average frequency. The average data rate provides substantially no offset, or phase difference, between a fixed data rate at which the RF receiver digitizes RF signals and an average data rate at which the digitized RF data signals are transported over a high-speed digital links. With substantially no offset (e.g., a zero DC offset), the fixed and average data rates are substantially synchronous. In a specific embodiment, an amount of temporary storage is selected such that data rates that are made equal to avoid exceeding a buffer overflow rate, which describes the data rate at which a buffer will overflow and data will be lost. By keeping data rates below the buffer overflow rate, proper reception of RF radio signals is maintained. In another specific embodiment, a phase-offset controller includes a peak minimizer to minimize peaking of a power spectral density of the variable frequency clock signal.

In one embodiment, the variable frequency clock signal establishes a zero direct current ("zero DC") spectral offset for the variable frequency clock signal at the average frequency. In another embodiment, the average frequency of the range of discrete frequencies minimizes a buffer size, wherein a buffer having the buffer size is configured to transition the propagation of the data signals from being clocked by the fixed clock frequency signal to being clocked by the variable frequency clock signal. In some embodiments, an amount of data entering the buffer at a fixed data rate determined by the fixed frequency is equivalent to another amount of data exiting the buffer at the average data rate. The phase-offset controller is further configured to distribute signal energy of data signals over one or more bands of frequencies, thereby minimizing amplitudes of power for electromagnetic emissions in the one or more bands of frequencies that develops as the data signals are driven through the digital data link. In various embodiments, the phase-offset controller is configured to select a maximum frequency, a minimum frequency, a first step size and a second step size. The maximum and minimum frequencies can be set to determine the frequencies over which the signal energy will be distributed in the one or more bands of frequencies. The first step size determines a first portion of the shape for the variable frequency clock signal over for each clock cycle. The second step size determining a second portion of the shape for the variable frequency clock signal, wherein the second portion provides for minimizing the peaking.

BRIEF DESCRIPTION OF THE FIGURES

The invention is more fully appreciated in connection with the following detailed description taken in conjunction with the accompanying drawings, in which:

FIG. 7 is a table defining discrete frequencies of a variable frequency clock signal as determined by a phase-offset controller, according to a specific embodiment of the present invention;

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1:
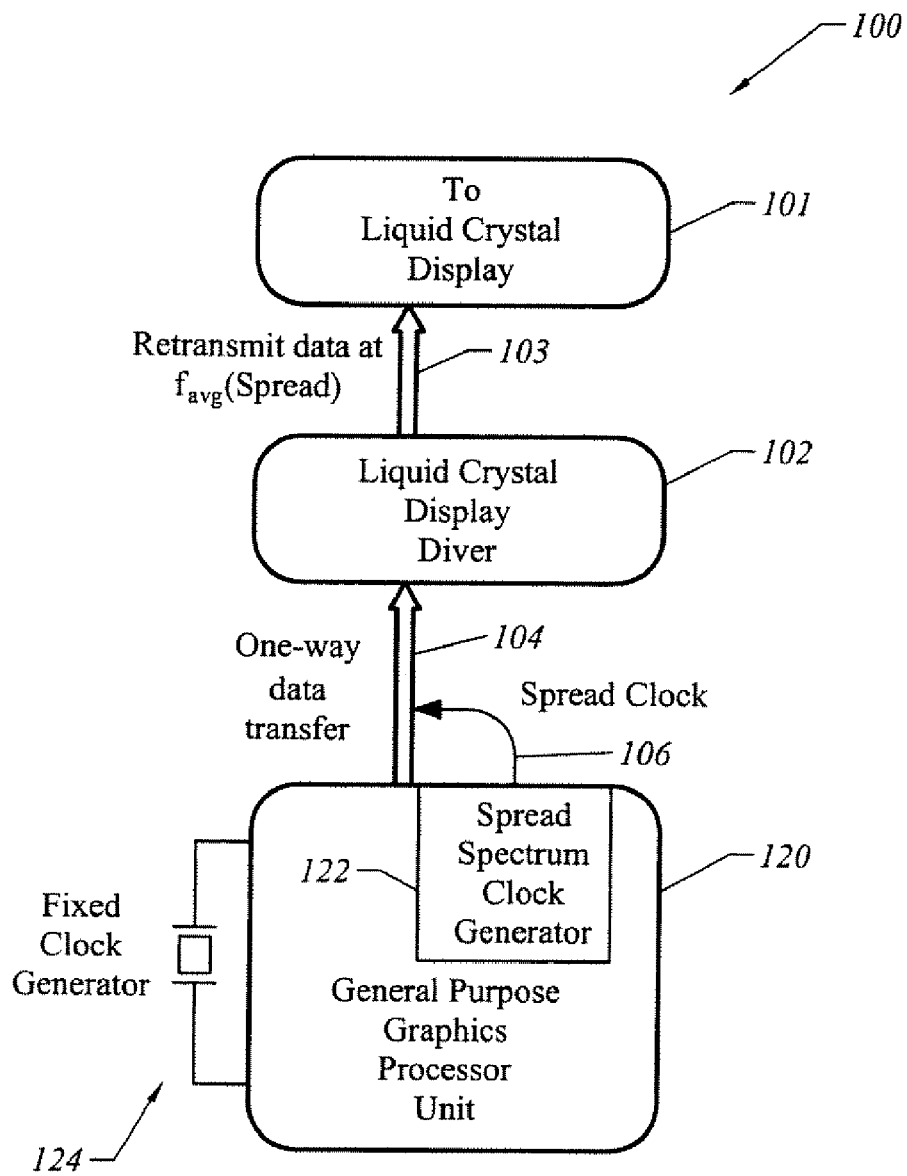
FIG. 1 depicts a typical system implementing a conventional spread spectrum clock generator for reducing EMI.
Figure 2:
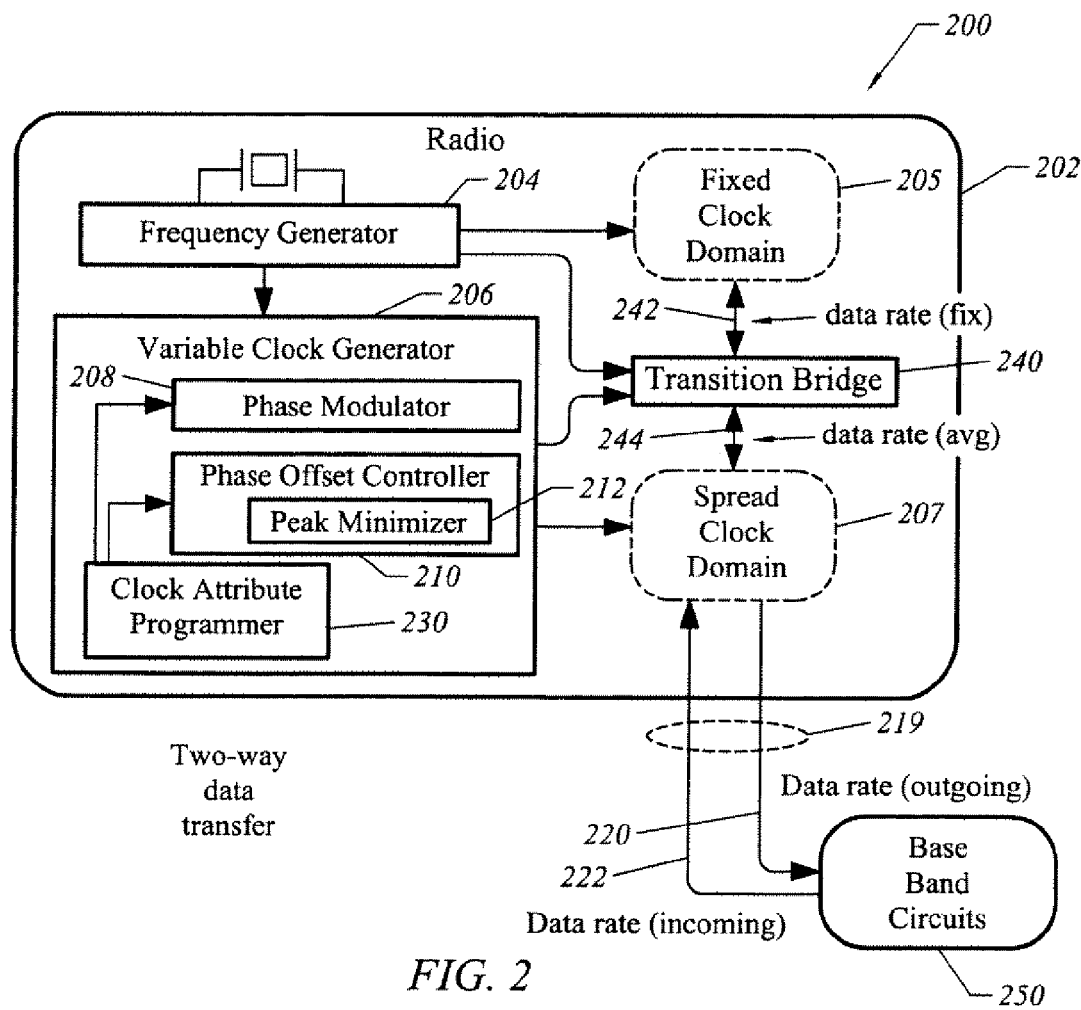
FIG. 2 illustrates an example of a radio frequency communications system implementing a variable clock frequency generator, according to one embodiment of the present invention.

FIG. 2 illustrates an example of a radio frequency ("RF") communications system 200 implementing a variable frequency clock generator, according to one embodiment of the present invention. RF communications system 200 includes a radio 202 that operates to transmit and/or receive wireless signals, such as radio frequency ("RF") signals from 3 kHz to 300 GHz (including VHF, UHF, and microwave frequencies). Radio 202 also exchanges communications data via a high-speed digital link 219 with base band subsystem 250. High-speed digital link 219 reduces interfering emissions (i.e., electromagnetic interference, or "EMI") that otherwise might violate a specific emission mask. An emission mask defines the maximum power levels over frequency during operation of RF communications system 200. As shown, radio 202 includes at least two clocks, each of which defines a separate clock domain. As to the first clock domain, a frequency generator 204 defines a fixed clock domain 205 in which a fixed clock operates to clock radio circuits (not shown) of radio 202. Note that radio 202 can implement the radio circuits as either a radio transmitter or a radio receiver, or both, as a radio transceiver. Examples of radio circuits include up converters, down converters, mixers, amplifiers, filters, analog-to-digital ("A/D") converters, and digital-to-analog ("D/A") converters.

As to the second clock domain, a variable clock generator 206 defines a spread clock domain 207 in which a spread clock signal establishes an outgoing data rate for outgoing communications data 220 via high-speed digital link 219 as well as an incoming data rate for incoming communications data 222. Also, at least a portion of base band circuits 250 implements the spread clock. The spread clock distributes signal energy of data signals over one or more bands of frequencies, thereby minimizing amplitudes of power for electromagnetic emissions in the one or more bands of frequencies, especially when the data signals are driven through high-speed digital link 219.

Radio 202 also includes a transition bridge 240 interfacing both clock domains 205 and 207 for transitioning the propagation of data signals between those clock domains. Specifically, variable clock generator 206 synchronizes an average data rate ("data rate (avg)") over a specific interval of time on path 244 to a fixed data rate ("data rate (fixed)") on path 242. Note that the average data rate is the average of the variable data rate over a specific interval of time. Note also that the term "data rate" refer to the rate at which data progresses from one point to a next point, and can be either at a "fixed data rate" or at a "variable data rate." The fixed data rate describes the rate at which data is transferred based on the fixed frequency clock signal, whereas the variable data rate describes the rate at which data is transferred based on the variable frequency clock signal (or spread clock signal). An average data rate describes the average rate at which data is transferred based an average frequency of the variable frequency clock signal. Unless otherwise specified, the terms "average data rate" and "average frequency" are generally referenced with respect to a given length of time, such as over an interval of time that it takes variable clock generator 206 to cycle through a programmable range of frequencies, such as the period ("T") 394 of FIG. 3. Advantageously, transition bridge 240 enables the retiming of data signals so that variable clock generator 206 can spread an amount of frequencies over a relatively wide range of frequencies that is 5% to 10%, for example, about the average frequency. Accordingly, the increased number of frequencies over which to spread more energy thereby provides better EMI reduction than that of some conventional spread spectrum clocks.

Variable clock generator 206 includes a phase modulator 208, a phase-offset controller 210, an optional peak minimizer 212, and an optional clock attribute programmer 230, according to a specific embodiment of the present invention. Phase modulator 208 operates to shift the fixed clock frequency signal generated by frequency generator 204 to form a variable frequency clock signal having a variable frequency. In particular, phase modulator 208 shifts the fixed clock frequency signal within a range of discrete frequencies at uniform intervals of time, the range of discrete frequencies being centered at a fixed clock frequency or at a multiple of the fixed clock frequency. For example, if the fixed clock frequency is 44 MHz, then the range of discrete frequencies can be centered at 44 MHz, or a multiple thereof, such as 264 MHz (i.e., 44 MHz*6). Multiples of the fixed clock frequency may be used to clock or transfer data between radio 202 and base band circuits 250 when, for example, parallel data transfers are converted to serial data transfers. If multiples of the fixed clock frequency are used, then the average frequency of the variable frequency clock signal is used to access data in transition bridge 240, whereas a multiple of the range of frequencies is used when transporting data via high-speed link 219. One having ordinary skill in the art should appreciate how to implement a parallel-to-serial converter (not shown), or vice versa, in spread clock domain 207 to employ multiples of the fixed clock frequency.

Phase-offset controller 210 sets an average data rate at which communications data is exchanged via path 244 between transition bridge 240 and spread clock domain 207 over varying frequencies in the range of frequencies. Further, phase-offset controller 210 is coupled to phase modulator 208 to synchronize the average frequency over specific intervals of time for the range of discrete frequencies so that the average frequency is equal or about equal to either the fixed clock frequency or a multiple thereof. By maintaining the average frequency equal to the fixed clock frequency, phase-offset controller 210 advantageously ensures that the throughput of data between clock domains 205 and 207 remains relatively constant over intervals of time. By transitioning communications data via transition bridge 240 at a constant throughput, delays or losses of data due to mismatched data rates between the clock domains is avoided, unlike what otherwise would be the case with one-way data transfers being clocked by conventional spread spectrum clock generators. Also, phase-offset controller 210 operates to maintain a zero direct current ("zero DC") spectral offset for the variable frequency clock signal. A zero DC spectral offset generally indicates that the average data rate on path 244 deviates negligibly (i.e., is synchronized therewith) from the fixed data rate on path 242, thereby producing substantially no offset or phase difference. Further, phase-offset controller 210 operates to reduce any timing offsets between a fixed data rate in the fixed clock domain and an average data rate in the variable clock. Advantageously, this prevents the average data rate from drifting from the fixed data rate to ensure the allotted storage is sufficient for proper radio operation. Without synchronizing the average data rate to the fixed data rate, either additional storage is required and/or data will be lost as will be shown below. In some embodiments, communications data signals are digitized data signals. In one embodiment, a suitable variable clock generator 206 can be implemented in an RF communications system and/or antenna system described in U.S. patent application Ser. No. 11/132,757, entitled "A Radio Frequency Antenna System and High-Speed Digital Data Link to Reduce Electromagnetic Interference for Wireless Communications" and filed on May, 18 2005, the disclosure of which is incorporated herein by reference in its entirety.

Note that the fixed clock frequency is configured to at least receive RF signals at an expected receive data rate into radio 202 from a transmission source, such as from a wireless LAN access point. The expected receive data is based on a fixed date rate. In one embodiment, frequency generator 204 generates the fixed data rate (e.g., at 44 MHz) to minimize deviations in the expected receive data rate to within 25 parts per million ("ppm") from that of an expected transmit data rate that is generated by a transmission source of the RE signals. In some embodiments, the fixed data rate, the expected receive data rate and/or the expected transmit data rate can be regulated by an industry standard, such as one of the IEEE 802.11 standards.

Clock attribute programmer 230, if implemented, operates to program clock attributes of the variable frequency clock signal to, for example, modify a frequency distribution profile. By programming one or more clock attributes, any number of frequency distribution profiles can be obtained. As such, clock attribute programmer 230 can program clock attributes to derive a specific distribution profile having a spectral profile, such those depicted in FIGS. 8 and 11, that complies with a specific emissions mask. Examples of some clock attributes are described next in FIG. 3. Note that clock attribute programmer 230, as well as phase modulator 208, phase-offset controller 210, and peak minimizer 212 each can be composed of software, hardware or combinations thereof. Note also that the functionality of peak minimizer 212, if implemented, is discussed below in FIGS. 9 to 11.

Figure 3:
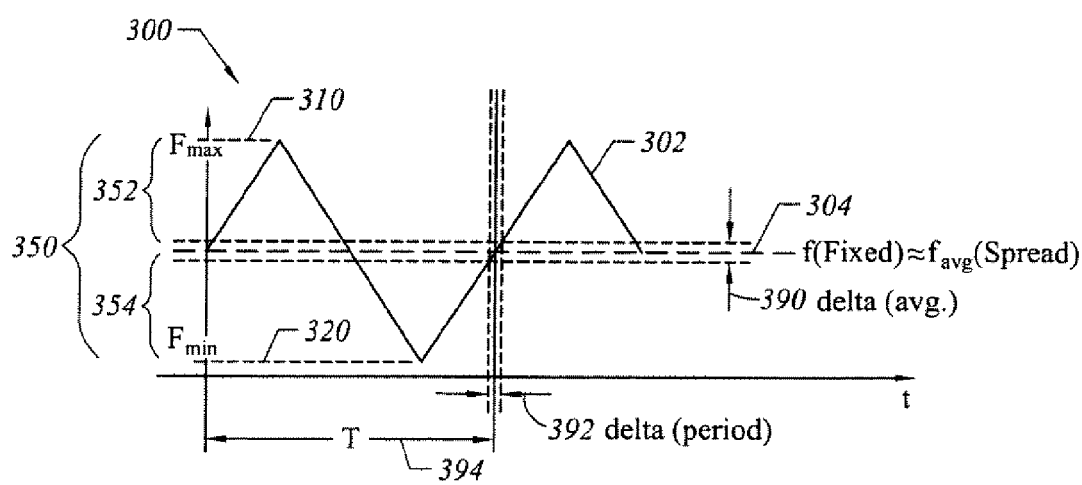
FIG. 3 is a diagram showing the spreading of frequencies by a variable frequency clock signal, the average of which over an interval of time is centered at or about a fixed frequency clock signal in accordance with one embodiment of the present invention.

FIG. 3 is a diagram 300 of a frequency distribution profile that shows the frequencies over which a variable frequency clock signal spreads spectral power in accordance with one embodiment of the present invention. Frequency generator 204 (FIG. 2) generates a fixed frequency clock signal having a fixed frequency ("f(Fixed)") 304. Variable clock generator 206 generates a variable frequency 302 that varies between a maximum frequency ("Fmax") 310 and a minimum frequency ("Fmin") 320. Fmax 310 and Fmin 320 define a range 350 of discrete frequencies. Notably, variable clock generator 206 centers the average of the variable frequency ("favg (spread)") at fixed frequency 304. By doing so, the digitized data signals will enter into or exit out of transition bridge 240 within spread clock domain 207 at an average data rate, which is based on the average of the variable frequency ("favg (spread)"). Similarly, the digitized data signals enter into or exit out of transition bridge 240 within fixed clock domain 205 at f(Fixed) 304. With the average frequency of variable frequency 302 being set at f(Fixed) 304, the data throughput between the clock domains is relatively constant over time. So in embodiments where transition bridge 240 is composed of one or more buffers, digitized data signals being clocked at a fixed data rate into a buffer of transition bridge 240 via path 242 is clocked out from that buffer at a variable data rate (and vice versa). Advantageously, phase-offset controller 210 synchronizes the average data rate over an interval of time to the fixed data rate to reduce deviations from that fixed rate, thereby minimizing the size of the buffer. This is because an amount of data entering the buffer at a fixed data rate is equivalent to another amount of data exiting the buffer at the average data rate (i.e., at the variable data rate, over time). In particular, phase-offset controller 210 synchronizes the average data rate to the fixed data rate to avoid increasing the buffer size and/or losing data due to buffer overflow with continuous drifting of the average data rate from the fixed data rate.

The maximum frequency, the minimum frequency, and a number of frequencies used to form a variable frequency clock signal within a range between the maximum and the minimum frequencies each are examples of clock attributes that can be set by clock attribute programmer 230 (FIG. 2). Other program clock attributes include: (1) the shape of frequency distribution profile (e.g., triangular, sinusoidal, saw tooth, etc.), which generally relates to the input modulation signal, an example of which is described in FIG. 5, (2) one or more step size approximations used to determine which of the discrete frequencies in the range will be used, (3) the period ("T") 394, (4) the portions of frequency distribution profile associated with a specific step size, (5) delta(period) 392 defining a tolerance of period 394, (6) delta(avg) 390 defining a tolerance of favg(spread) about f(fixed), and the like. As an example, consider that radio receiver circuits operate at a fixed frequency of 44 MHz, then variable clock generator 206 can be programmed to set its average frequency as measured over an interval of time at that fixed frequency. This ensures that the average frequency does not drift over time, but rather remains substantially synchronized to the fixed frequency. One or more of these clock attributes can be used to ensure that the data rates between clock domains remain relatively constant. Furthermore, any of these attributes can be programmed to ensure that a buffer overflow rate, which is described next, is not surpassed.

Transition bridge 240 has at least one buffer characteristic, buffer overflow rate ("B(over)"), which describes the data rate at which a buffer will overflow and data will be lost for a given amount of temporary storage. Any variable data rate that exceeds the buffer overflow rate causes data entering into transition bridge 240 to be lost. Similarly, the fixed data rate can exceed the buffer overflow rate when the variable data rate, as the output rate, is below the fixed data rate, as the input rate. By synchronizing data rates between a fixed clock domain and a variable clock domain, variable clock generator 206 can minimize the amount of temporary storage (e.g., buffer) required to transition digitized communications data between multiple clock domains by minimizing the deviations in the two data rates. One or more above-described clock attributes can be modified to ensure that the buffer overflow rate is not exceeded. Note that in some embodiments, a different buffer overflow rate may be applicable to each emission mask requiring compliance. In some cases, range 350 may include more frequencies for one emission mask and fewer frequencies for another emission mask. Enough temporary storage should be reserved so that when the input rate of data entering transition bridge 240 exceeds the output rate, the buffer overflow rate is not exceeded regardless of amount of frequencies in the range. Typically, the amount of memory is set based on the largest applicable range of frequencies 350.

Figure 4:
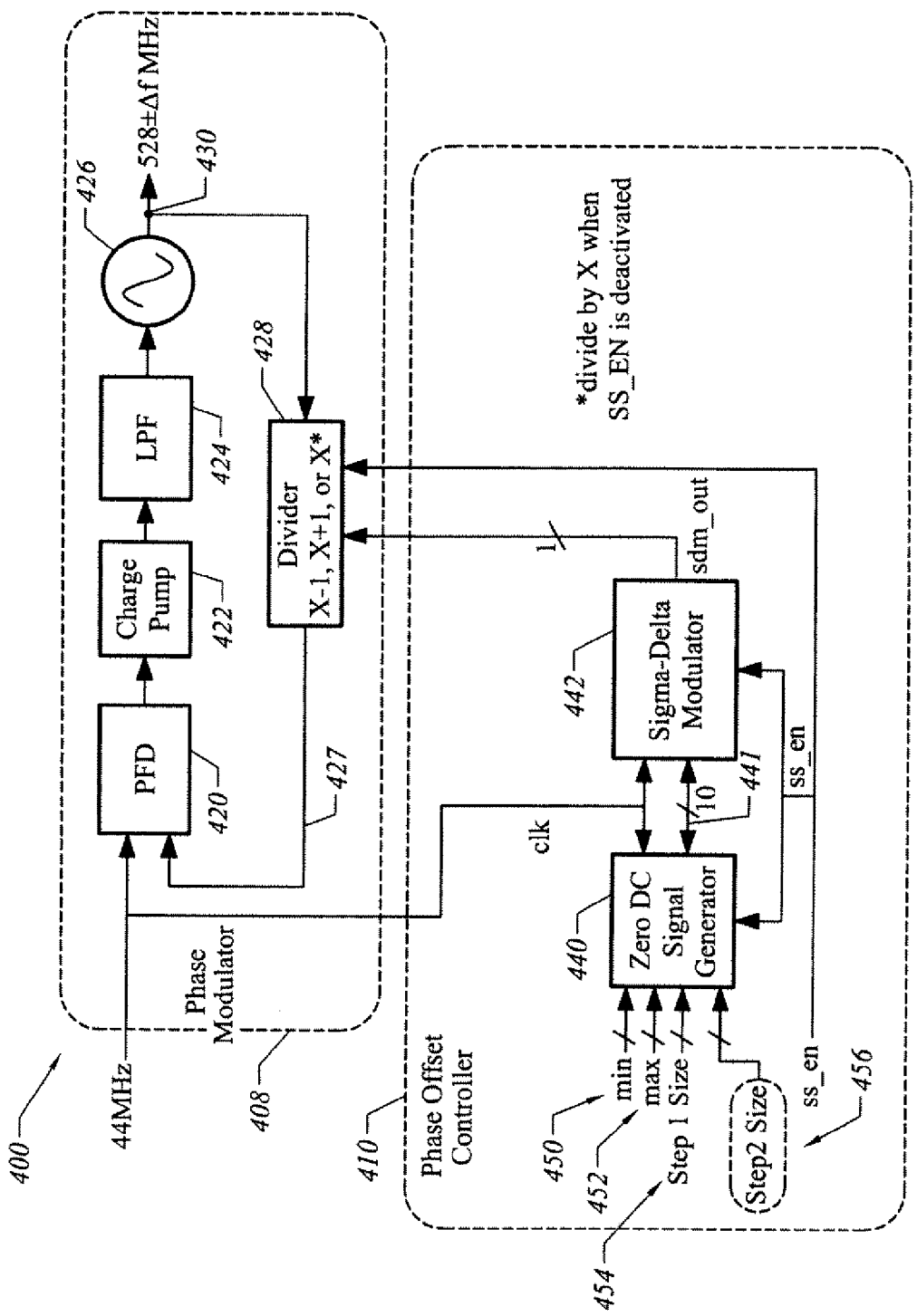
FIG. 4 is a block diagram illustrating one example of a variable frequency clock generator configured to synchronize an average data rate over an interval of time with a fixed data rate, according to one embodiment of the present invention.

FIG. 4 is a block diagram illustrating one example of a variable clock generator 400 configured to synchronize an average data rate over specific periods of time with a fixed data rate, according to one embodiment of the present invention. In this example, variable clock generator 400 implements programmable clock attributes to formulate as a specific frequency distribution profile. As is discussed below, the clock attributes include a first step size and an optional second step size.

Phase modulator 408 is shown as a spreading phase-locked loop ("sPLL") including a phase-frequency detector ("PFD") 420 for detecting differences in frequencies, a charge pump 422, a low pass filters ("LPF") as a loop filter and a voltage-controlled oscillator ("VCO") 426, all of which cooperate to generate a variable frequency clock signal at output terminal 430. For example, if 44 MHz is fed into phase modulator 408, then a variable frequency is generated at output terminal 430 that varies by about a multiple of the fixed frequency, such as 528 MHz (e.g., 44 MHz*12). The output of phase modulator 408 at output terminal 430 feeds back the variable frequency clock signal into a divider 428, which operates in accordance with phase-offset controller 410.

In one embodiment, divider 428 divides a value representing the frequency of the variable frequency clock signal by one of three numbers: X−1, X+1, and X. Note that when rate-averaging spread spectrum clock generation is not enabled, then the control signal enable spread spectrum ("SS_EN") is deactivated, resulting in continuous division by X. So if the variable frequency clock signal is centered at 528 MHz and X is 12, thereby resulting in 44 MHz (e.g., 528 MHz/12) being fed into PFD 420, with a zero phase difference being detected. Hence, the variable frequency clock signal would be fixed at 528 MHz. But when rate-averaging spread spectrum clock generation is enabled, then control signal SS_EN activates divider 428 to divide a value for the variable frequency clock signal by either X−1 or X+1. Further to the example where the variable frequency clock signal is centered on 528 MHz, when phase-offset controller sets X+1 to 13 (e.g., X is 12), then the feedback frequency on path 427 is less (e.g., 528 MHz/13≈40.6 MHz) than the fixed clock of 44 MHz. PFD 420 will detect the difference and will increase the value for the variable frequency clock signal. In reverse fashion, when phase-offset controller sets X−1 to 11, then the feedback frequency on path 427 is more (e.g., 528 MHz/11≈48 MHz) than the fixed clock of 44 MHz. PFD 420 will detect the difference and will decrease the value for the variable frequency clock signal. Accordingly, phase-offset controller 410 selects the values of X−1 and X+1 to instantaneously sweep up and down frequencies about a center frequency in a manner that apportions half the spectral density above the center frequency and half below that frequency.

Phase-offset controller 410 includes a zero DC signal generator 440 and a rate-averaging sigma-delta modulator 442, both of which operate in synchronization with a fixed clock signal ("clk"), such as 44 MHz. Zero DC signal generator 440 generates an input modulation signal on path 441 that is conveyed to rate-averaging sigma-delta modulator 442. The input modulation signal is a specific waveform that controls the spreading of the variable frequency clock signal about the average frequency within a range of discrete frequencies between a maximum and a minimum frequency. Notably, the input modulation signal is configured so that the sum of discrete values of the input modulation signal is equal to zero over any integer period of time, hence the name "zero DC." Zero DC signal generator 440 is programmable such that the minimum frequency is controlled by a "min" input 450, the maximum frequency is controlled by a "max" input 452, and a first step size is set by "Step 1 size" input 454. The first step size determines the slope of the input modulation signal and determines which of the discrete frequencies will be used in spectrum spreading. In one embodiment, zero DC signal generator 400 is a programmable up-down counter. Although the input modulation signal can be of any shape (e.g., sinusoidal, saw tooth, etc.), in this embodiment it is a triangular digital waveform generated in digital step sizes. The input modulation signal can be represented by, for example, 10 bits. For each cycle of the fixed clock ("clk"), the up-down counter is either incremented or decremented by the first step size, thereby varying the value of the variable frequency clock signal from one (i.e., precedent) frequency to a next (i.e., subsequent) frequency. In another embodiment, zero DC signal generator 440 is programmable to include a second step size that is set by "Step 2 size" input 456. The second step size determines by how much the peaks of the inflections points of a waveform for the input modulation signal will be increased to simulate an optimal input modulation signal for output onto path 441. For example, the upper and lower corners or points of a triangular waveform are inflection points as there is a change in the slope from increasing to decreasing, or vice versa. In one embodiment, an optimal input modulation signal is one that reduces peaking in power of a spectral profile (or "emissions profile") that describes the EMI emissions. Both the first and second step sizes will be discussed further in FIGS. 5 and 10.

Rate-averaging sigma-delta modulator 442 is a 1-bit digital sigma-delta modulator that generates a single-bit pattern for controlling divider 428 of phase modulator 408. The output of rate-averaging sigma-delta modulator 442 switches between X+1 (e.g., 13) and X−1 (e.g., 11) to either increase or decrease the variable frequency. Importantly, rate-averaging sigma-delta modulator 442 is a rate-averaging sigma-delta modulator that has a unique functionality to switch between X+1 and X−1 for spreading equal amounts of signal energy of digitized data signals above an average frequency (e.g., half the spectral spreading being above 528 MHz) and below that average frequency (e.g., half the spectral spreading being below 528 MHz). This configuration of rate-averaging sigma-delta modulator 442 is unlike conventional uses of sigma-delta modulators, which are usually used to perform "noise shaping." Noise shaping is a technique for reducing quantization noise in a particular band of frequencies by shaping the noise out of that band, typically above the frequencies of interest. Note that in some embodiments, rate-averaging sigma-delta modulator 442 can generate bit patterns wider than 1-bit.

Figure 5:
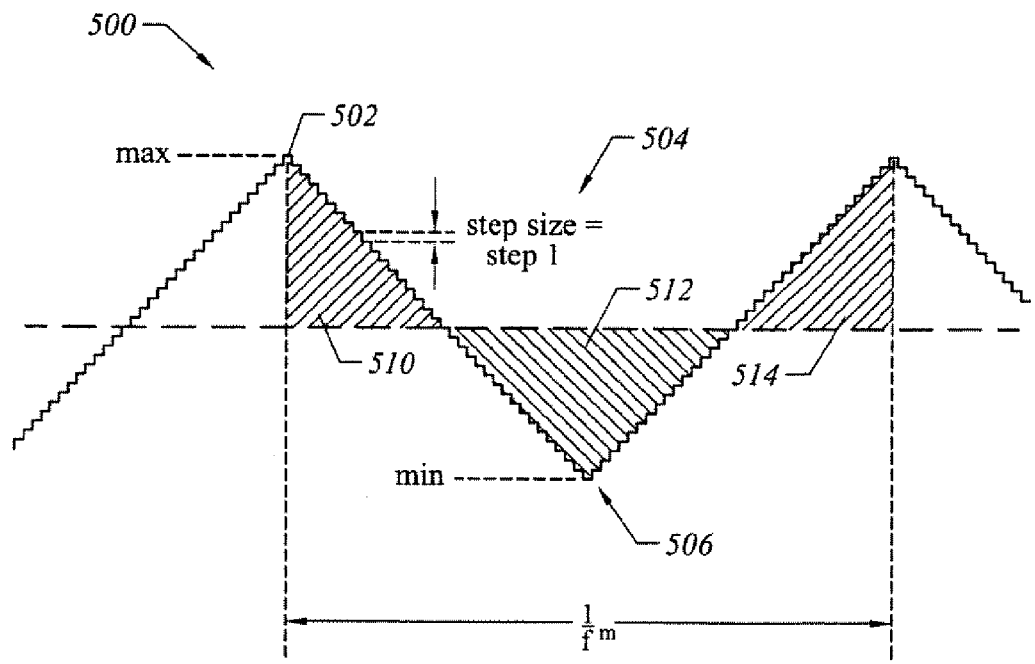
FIG. 5 is a diagram for an example input modulation signal in accordance with one embodiment of the present invention.

FIG. 5 is a diagram for an example input modulation signal in accordance with one embodiment of the present invention. As shown, waveform 500 is a triangular waveform increasing and decreasing by a first step size 504 between a maximum value ("max") 502 corresponding to a maximum frequency and a minimum value ("min") 506 corresponding to a minimum frequency. The larger the difference between the maximum and the minimum frequencies, the more signal energy is spread, thereby reducing EMI amplitude peaks. First step size 504 is associated with a difference between a subsequent frequency and a precedent frequency, and has a magnitude that is implemented during each clock cycle of the fixed clock frequency to form a staircase-like waveform. Note that the sum of the discrete frequency values defining areas 510, 512 and 514 equals to zero over a period of 1/fm, where fm is the modulation frequency. In particular, area 512 is subtracted from the sum of areas 510 and 514, these areas being suggestive of the spreading of the spectral power above and below a fixed frequency.

Figure 6:
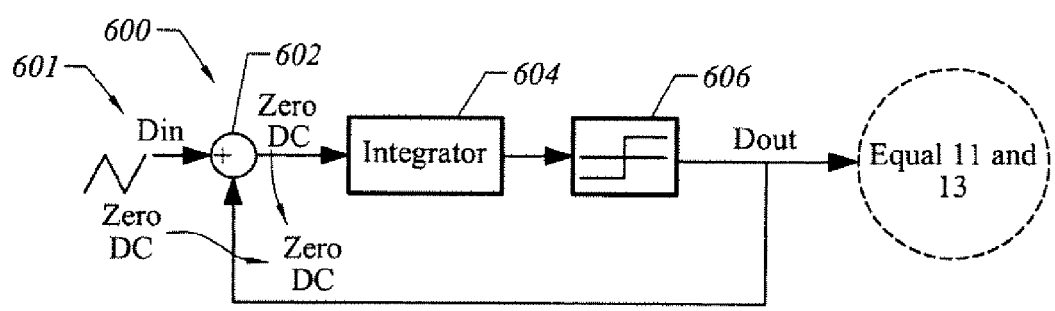
FIG. 6 is a block diagram depicting an exemplary structure for a rate-averaging sigma-delta modulator, according to one embodiment of the present invention.

FIG. 6 is a block diagram depicting an exemplary structure for a rate-averaging sigma-delta modulator, according to one embodiment of the present invention. Rate-averaging sigma-delta modulator 600 has an input terminal 601 for receiving the input modulation signal. It also includes a summing unit 602, an integrator 604 for performing loop integration and a comparator 606 that generates a 1-bit output, which is fed back into summing unit 602. In operation, rate-averaging sigma-delta modulator 600 receives input codes representative of frequency values of the input modulation signal. When the input codes reach a specific switching threshold, comparator 606 will switch divider 428 (FIG. 4) between X+1 and X−1.

FIG. 7 is a table defining discrete frequencies of a variable frequency clock signal as determined by a phase-offset controller, according to a specific embodiment of the present invention. Table 700 includes input codes 702 for being input into rate-averaging sigma-delta modulator 600 (FIG. 6) and respective discrete frequencies 704 for implementing spectrum spreading. As an example, consider that a minimum frequency is set to 506 MHz (which corresponds to an input code of −64, which is represented in twos complement, or "twos cmp") as shown in entry 710 and a maximum frequency is set to 550 MHz (which corresponds to an input code of +64) as shown in entry 714. The switching threshold in this example is an input code of "0" as shown in entry 712 such that when input codes 702 are within 0 and +64, then the divider of the phase modulator divides by X+1 such that the ratio between X+1 and X−1 (e.g., X+1/X−1) is greater than one, whereas when input codes 702 are within −64 and 0, then the divider of the phase modulator divides by X−1 such that the ratio between X+1 and X−1 is less than one. The magnitude of the ratio determines how far the output frequency will deviate from the frequency associated with the input code of "0."

Figure 8:
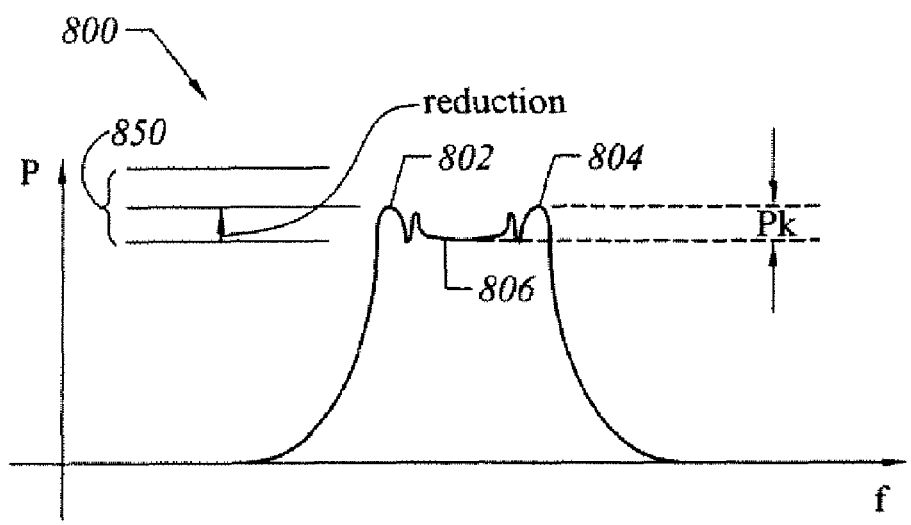
FIG. 8 depicts a spectral profile resulting from generating a variable frequency clock signal using the phase-offset controller in accordance to at least one embodiment of the present invention.

FIG. 8 depicts a spectral profile resulting from generating a variable frequency clock signal using the phase-offset controller in accordance to at least one embodiment of the present invention. Spectral profile 800 includes peaks 802 and 804 at its edges, these peaks rising above a trough 806 in the middle of the profile. Peaks 802 and 804 effectively reduce an operational margin under an emission mask by an amount or power defined by "Pk." To illustrate, consider that an EMI emission mask is 54 dBuV/m and trough 806 is 44 dBuV/m. So if Pk is equal to 3 dB, for example, then the margin for system will be 7 dB instead of 10 dB for trough 806. This provides less tolerance that can lead to noncompliance of an EMI emission mask, such as an FCC emission mask. To remove these peaks, clock attribute programmer 230 programs a second step size (i.e., step 2 size), as described next.

Figure 9:
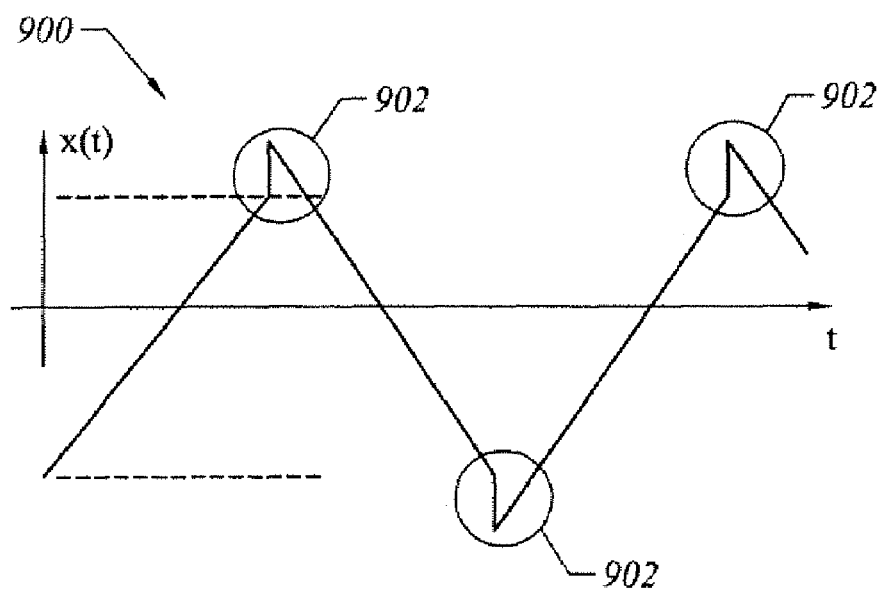
FIG. 9 illustrates an optimal input modulation signal input into a rate-averaging sigma-delta modulator to minimize peaking, according to one embodiment of the present invention.

FIG. 9 illustrates an optimal input modulation signal input into a rate-averaging sigma-delta modulator to minimize peaking, according to one embodiment of the present invention. Waveform 900 includes sharp or exaggerated peaks at upper and lower corners 902 of the triangular waveform 900. The sharp peaks at corners 902 result in the minimization of peaks 802 and 804 (FIG. 8), thereby increasing the operational margin under an emission mask.

Figure 10:
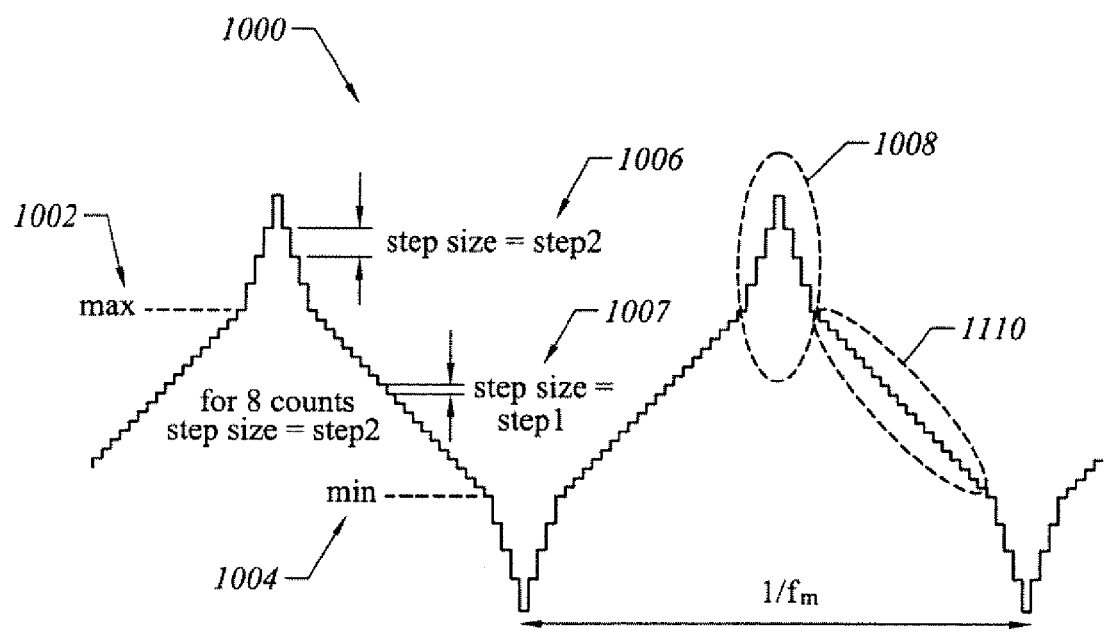
FIG. 10 is a diagram for another exemplary input modulation signal formed by using a peak minimizer in accordance with one embodiment of the present invention.

FIG. 10 is a diagram for another exemplary input modulation signal formed by using a peak minimizer in accordance with one embodiment of the present invention. Peak minimizer operates to include a second step size for minimizing or removing peaking associated with an associated spectral profile. As shown, waveform 1000 is a triangular waveform increasing and decreasing by a first step size 1007 between a maximum value ("max") 1002 corresponding to a maximum frequency and a minimum value ("min") 1004 corresponding to a minimum frequency. In particular, first step size 1007 is applicable during portions 1110 of waveform 1000, whereas a second step size 1006 is applicable to other portions 1008. Second step size 1006 is implemented at or near the maximum and/or minimum frequencies. It is portions 1008 implementing second step sizes 1006 that mimic corners 902 (FIG. 9) of an optimal waveform. Note again that the sum of each of the discrete frequency values of waveform 1000 is equal to zero over a period of 1/fm, where fm is the modulation frequency.

Figure 11:
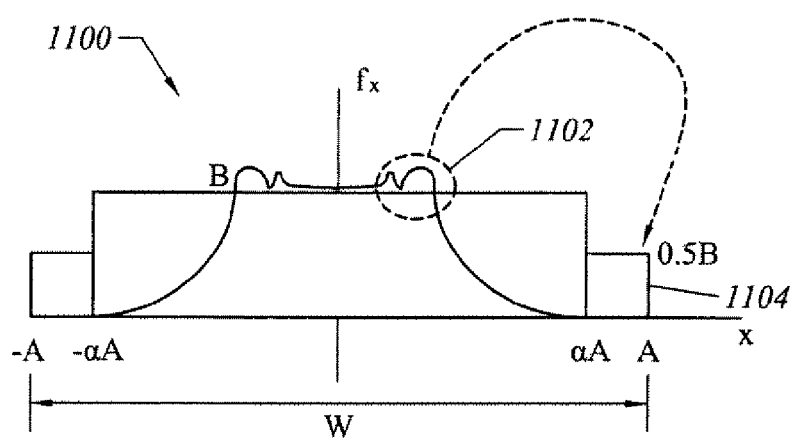
FIG. 11 is a diagram of power spectral density resulting from the use of peak minimization techniques in accordance with embodiments of the present invention.

FIG. 11 is a diagram of power spectral density 1100 resulting from the use of peak minimization techniques in accordance with embodiments of the present invention. As shown, peaks 1102 are minimized or removed such that the associated energy 1104 is displaced to frequencies adjacent to the original band of frequencies. So although the width of the band is increased to "W," the peaks 1102 that otherwise would effectively reduce an operational margin are removed. The second step size therefore can be implemented to attenuate peaking of a power spectral density for a variable frequency clock signal. Consequently, a radio communication system implementing a peak minimizer can increase the margin that it can operate in without violating an emission mask. A common emissions mask is a class B emissions mask set forth by the FCC. This emission mask define limits of radiated emissions to 40, 43.5, 46 and 54 dB V/m for respective frequency ranges 30 to 88, 88 to 216, 216 to 960 and greater than 960 MHz. In other embodiments, communication systems and/or elements thereof include spectral mask limitations for 802.11a/b/g devices and/or other standards of the IEEE 802.11 family. By implementing peak minimizer of the present invention, the likelihood of complying with these exemplary masks is increased.

An example of frequencies that the communication system of the present invention is suitable to transmit and receiver are those used in wireless LAN applications, which can be governed by IEEE standard 802.11. The present invention is applicable to a wide-range of frequencies in which EMI radiation reduction, among other things, is desired in a communications system (e.g., RF communications). EMI reduction, minimization and negation can be view in view of FCC emissions standards and masks, as well as other EMI specifications. The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. For example, although the above description of the embodiments related to an RF communications system, the discussion is applicable to all communications systems. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. It is intended that the following claims and their equivalents define the scope of the invention.

The invention claimed is:

1. A method of timing the exchange of data signals via a digital data link between radio frequency ("RF") radio circuits and a base band processor to minimize electromagnetic emissions causing interference ("EMI"), the method comprising:

generating a fixed clock signal having a fixed frequency;

forming a modulation signal having a waveform shaped to spread a first subset of frequencies in a range of frequencies above a first frequency and to spread a second subset of frequencies in said range of frequencies below said first frequency;

adjusting an amplitude of said modulation signal representing a frequency by a first increment to form slope portions of said waveform between a maximum amplitude and a minimum amplitude that respectively determine a maximum frequency and a minimum frequency; and generating said variable data rate based on said modulation signal composed of said slope portions of said waveforms, wherein said first subset and said second subset of frequencies set a zero direct current ("zero DC") spectral offset with respect to said fixed frequency;

modifying inflections of said waveform by a second increment to form inflection portions of said waveform;

generating said variable data rate based on said modulation signal composed of both said slope portions and said inflection portions of said wavetbrms, said second increment being configured to reduce peaking of an emission profile for electromagnetic emissions;

centering said first frequency at said fixed frequency; and establishing an average data rate based on an average of said range of frequencies.

2. The method of claim 1 further comprising switching a divisor of a spreading phase-locked loop to select frequencies from either said first subset or said second subset.

3. The method of claim 1 wherein said waveform is triangular and said first and said second increments are implemented each cycle of said fixed frequency.

4. The method of claim 1 further comprising determining a buffer size of a buffer for transitioning data signals between clock domains that includes:

determining a first amount of memory that is loaded with data at said variable data rate from said minimum frequency to said maximum frequency over an interval of time;

determining a second amount of memory from which data is retrieved during said interval of time;

reducing said first amount by said second amount to form an average amount of memory, said average amount of memory establishing said buffer size; and setting said average amount of memory at approximately one-half of said buffer size.

* * * * *